UNITED STATES PATENT OFFICE.

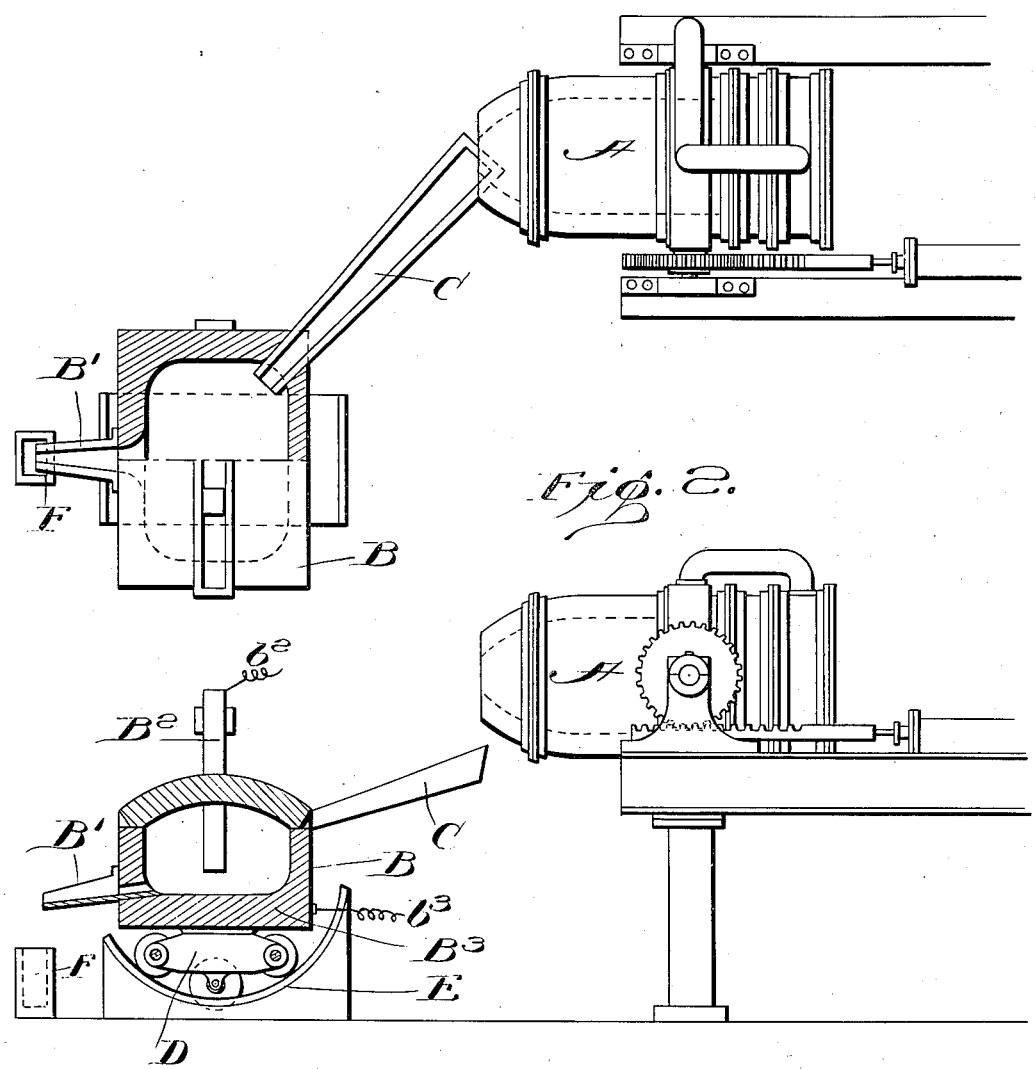

FRANK LINDEN ANTISELL, OF NEW YORK, N. Y.

PROCESS OF PRODUCING ALLOYED STEEL.

951,385.  Specification of Letters Patent.  Patented Mar. 8, 1910.

Application filed April 3, 1907. Serial No. 366,064.

*To all whom it may concern:*

Be it known that I, FRANK LINDEN ANTISELL, a citizen of the United States, and a resident of the city, county, and State of New York, have invented certain new and useful Improvements in Processes of Producing Alloyed Steel, of which the following is a specification.

My invention relates to the process of manufacturing alloyed steel by first melting the steel in a primary furnace and then pouring the melted steel into an electric furnace where it combines with the alloys, forming the alloyed steel.

The object of my invention is to treat steel in the ordinary acid furnace, called the "primary furnace" so that the steel treated in said furnace can be poured into the electric furnace called the "secondary furnace," so that the resultant slag in the primary furnace can be removed before the steel enters the electric furnace, and the alloyed steel can be made in the electric furnace without coming into contact with the oxidizing influence of the air.

Other objects will appear from the hereinafter description.

In carrying out my process, many types of apparatus may be used. I have illustrated in the accompanying drawing, one form of apparatus for carrying out said process.

Referring to the drawing, Figure 1 is a plan view of the furnaces and their connections for carrying out my process, part of the electric furnace being in section. Fig. 2 is a side elevation of the same with the electric furnace and trough leading thereto in section.

On the drawing, the part lettered A represents a Bessemer furnace which may be of ordinary type and is mounted on trunnions so that it may be tilted.

B is the electric furnace and C is the trough or channel leading from the Bessemer converter to the electric furnace.

The electric furnace is mounted on a truck D moving on a curved track E so that this furnace may be tilted.

B' is the spout leading from the electric furnace over the ingot mold F, into which the alloyed steel is poured.

$B^2$ is one of the poles leading into the electric furnace, it being connected to the conductor $b^2$. $b^3$ is the other conductor, it being connected to a portion of the furnace, $B^3$, which forms the other pole.

In carrying out my process, the steel in its first form is produced in the Bessemer converter. This primary steel by which is meant the purest ferrite that can be obtained in a Besemer converter is then introduced into the electric furnace through the channel C, where it comes in contact with molten chromium, tungsten, vanadium, titanium, molybdenum or other similar elements, and combines with said element or elements to form the alloyed steel. This alloyed steel is then poured out of this electric furnace into the ingot mold F by the truck being moved on the curved track. Before the primary steel is introduced into the electric furnace, it must be borne in mind that the slag is removed so that only the steel, free of the slag, is introduced into this electric furnace. The object in having the electric furnace arranged for tilting is for convenience for pouring into molds, either for ingots or for castings.

The form of melting furnace need not necessarily be a tilting furnace or a Bessemer converter, as a crucible furnace could be equally well adapted for charging the electric furnace, and this primary furnace can be so arranged in relation to the electric furnace that the charge can be introduced directly into the electric furnace, dispensing with the channel or trough C; but in any case, the resultant slag of the ordinary furnace must be skimmed from the primary steel before the steel is introduced into the electric furnace, or this steel must be tapped from the primary furnace, leaving the slag behind so that no slag will find its way into the electric furnace.

The electric furnace should be of sufficient capacity to hold the primary charge with the addition of the alloyed charges, and although it is not necessary that it should hold the full capacity of the primary furnace, it is preferable to be in such proportion to the primary furnace that there might be one or two charges taken from the electric furnace to one charge of the primary furnace.

The different chemical constituents of the primary furnace can be regulated and introduced into the electric furnace whose chemical product is known, and thus a steel of the required chemical constituency is formed, and the primary steel, which may be the result of any of the well-known methods of manufacture, can be combined in the electric furnace, which will give a final steel containing products which have been decided upon by the combination of the chemical properties obtained from both furnaces. From this it is seen that by this method a steel can be produced which contains a predetermined specific alloy.

By this process, the difficulty heretofore experienced in thoroughly alloying the final product when the product of the secondary furnace is introduced in the primary furnace, has been overcome. By my method, the steel, instead of coming into contact with the oxidizing influence of the air, is introduced into a closed electric furnace, thereby obtaining a thorough and complete chemical reaction, free from oxygen, nitrogen or any of the other various elements contained in the air, and I make possible absolutely amalgamation of alloys with the primary steel producing a steel which is absolutely homogeneous, with the exception of the usual segregations that occur in it.

Having now described my invention, what I claim as new and desire to secure by Letters Patent is:

1. The process which consists in forming primary steel, introducing said steel into an electric furnace containing an alloying element, and combining in said electric furnace the said steel and alloying element to form an alloyed steel.

2. The process which consists in forming primary steel in a furnace, removing from said furnace the primary steel free from slag, introducing said primary steel into a closed electric furnace containing an element which will alloy with the steel, and combining with said steel the said alloy in said closed furnace to form alloyed steel.

3. The process which consists in forming primary steel in a furnace, removing from said furnace the primary steel free from slag, introducing said primary steel into a closed electric furnace containing an element which alloys with steel, forming alloyed steel, and pouring said alloyed steel from the electric furnace into a mold or other receptacle.

4. The process which consists in forming primary steel, introducing said steel into a closed electric furnace containing titanium, and combining with said steel the said titanium to form titanium steel.

5. The process which consists in forming primary steel, introducing said steel into a receptacle containing titanium, and combining the said steel and titanium to form titanium steel.

In testimony whereof I have hereunto set my hand at New York, county of New York and State of New York, this 21st day of March, 1907.

FRANK LINDEN ANTISELL.

In presence of—
JOHN J. RANAGAN,
ALLAN W. FOOSE.